Patented July 28, 1931

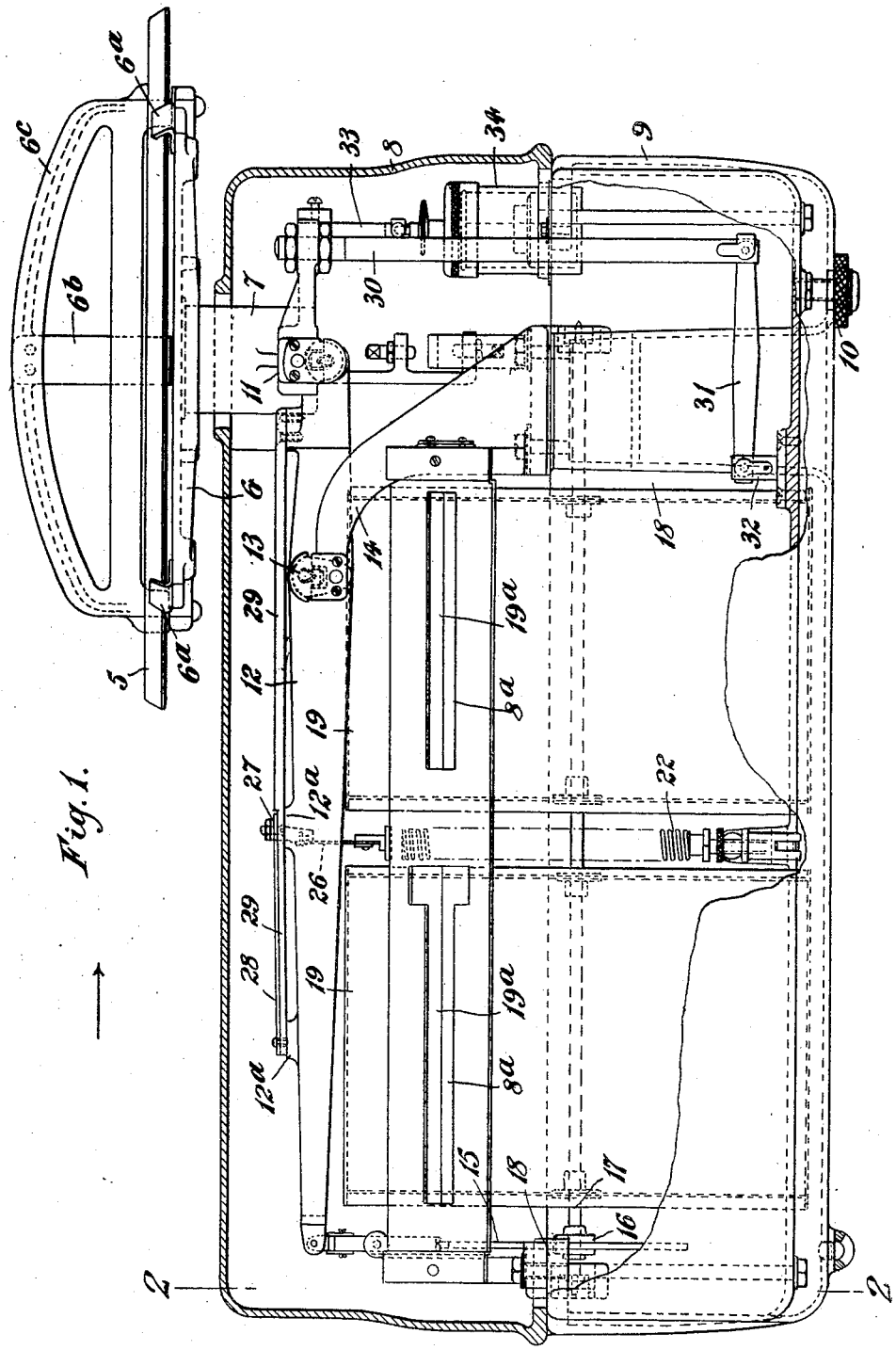

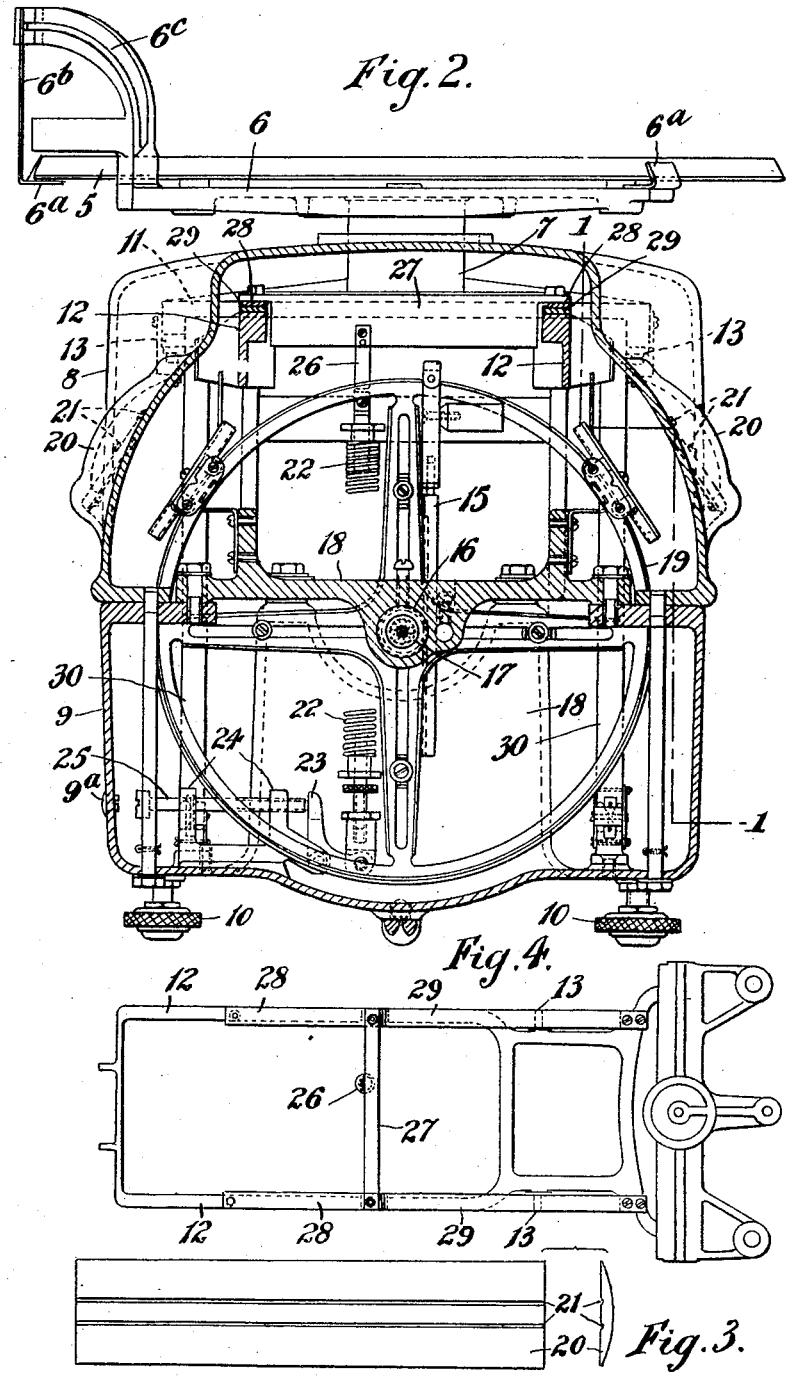

1,815,995

UNITED STATES PATENT OFFICE

WILLIAM TIMSON, OF BIRMINGHAM, ENGLAND, ASSIGNOR TO W. & T. AVERY LIMITED, OF BIRMINGHAM, ENGLAND

WEIGHING APPARATUS

Application filed December 11, 1928, Serial No. 325,272, and in Great Britain March 30, 1928.

This invention has reference to improvements in or relating to weighing apparatus and has for its object the provision of an improved automatic weighing apparatus which is simple in construction, efficient in operation, compact and capable of being produced at a relatively low cost.

The invention consists of an improved automatic weighing apparatus wherein a scale-pan is disposed above and to one side of a rotary weight indicator and has connection with a lever which in turn is connected to an automatic weighing resistant and to means for rotating the rotary weight indicator and for magnifying the movement of the aforesaid lever. The invention also resides in the incorporation in the improved automatic weighing apparatus where the automatic resistant is in the form of a spring or springs of a thermostatic device comprising a member or members which is or are anchored at its or their one end to the scale lever and at their other end or ends are connected to the automatic resistant, said member or members being made of a material having a different co-efficient of expansion to the material of which the scale lever is made and of dimensions such that changes of temperature effect an alteration in the moment of point or points of attachment of the resistant about the fulcrum of the scale lever which reduces automatically errors accruing through changes in the resistance effect of the resistant due to variations of temperature. The invention further resides in the details of construction to be described hereinafter.

The invention will now be described with particular reference to the accompanying sheet of drawings, wherein:

Figure 1 is a part sectional front elevation of a weighing scale constructed in accordance with the invention.

Figure 2 is a part sectional end view of the weighing scale seen in Figure 1 looking in the direction of the arrow in the said figure.

Figure 3 is a front and end elevation of the reading lens showing the manner of denoting the reading zone thereof.

Figure 4 is a plan of the weighbeam and the thermostatic device.

The scale plate 5 is provided with a bevelled edge and is adapted to be secured to a support 6 by means of three equi-distantly spaced sheet metal clips 6ª. The front pair of clips 6ª are secured directly to the support the rearmost clip 6ª being attached to the lower end of a resilient sheet metal arm 6ᵇ the upper end whereof is secured to the back rail 6ᶜ of the support. The support 6 is carried at the upper end of a cylindrical pillar 7 adapted to depend through an aperture formed in the upper side of a housing 8 of a substantially inverted U shape in cross section. This housing 8 is mounted upon a trough section base housing 9 supported on adjustable feet 10 in known manner. The lower end of the pillar 7 is fixed to the centre of a cross bar 11 mounted on knife-edges carried at the rear end of the shorter arms of a duplex weighbeam 12 of the first order said weighbeam 12 being fulcrumed on knife-edges 13 supported in bearings carried by a framing 14 which extends laterally from a support fixed to the housing 9 below the scale plate supporting means. The ends of the longer arms of the lever 12 are joined by means of a further cross bar to the centre of which is pivotally connected a depending U shaped frame having pivotally connected thereto the upper end of a rack bar 15 the teeth whereof mesh with the teeth of a pinion 16 fixed on the outer end of a horizontally disposed spindle 17 rotatably mounted in bearings carried by a pair of brackets 18 supported from the base housing 9. The teeth of the rack 15 are maintained in contact with the teeth of the pinion by means of the usual roller not shown which bears on the rear edge of the rack bar. Secured to and symmetrically disposed about the spindle 17 is a cylindrical drum 19 the periphery whereof is graduated in terms of weight and price values in known manner. The weight and price charts register with fixed longitudinally disposed index wires 19ª in known manner and the weight and price values are readable on each side of the scale through lenses 20 which are visible through elongated longitudinally arranged slots 8ª formed in the housing 8. The lenses 20 are provided with pairs of parallelly longitudinally disposed bars 21 which demark the portions of the lenses through which the readings are to be observed. The reading zones so formed are made of dimensions such that readings made therethrough must of necessity have only a small margin of error due to parallax whereby a sufficiently accurate reading of the scale can be made by people of varying stature without the annoyance of registering antiparallax reading devices of the kind commonly employed.

The drum 19 is formed in two sections between which is located a spring resistant 22 the lower end whereof is anchored to one arm of a bell crank lever 23 fulcrumed in brackets 24 supported from the base housing 9 the other arm of the said lever abutting the end of a screw 25 mounted in screw boxes formed in upstanding arms of the brackets 24. Access to the screw 25 is gained by removing a cover 9ª in the base housing 9 whereby the said screw may be adjusted and the lever 23 rocked for effecting an adjustment of the resistant spring 22 as and when required.

The upper end of the resistant spring 22 is adjustably connected to the lower end of a flexible metallic strip 26 the upper end whereof is anchored to a transverse bar 27 connecting the inner ends of a pair of rods 28 the outer ends whereof are secured to the ends of a pair of bars 29 which are disposed above and parallel with the arms of the lever 12, the other ends of the said bars being screwed to the arms of the lever 12. The undersides of the bars 29 rest on projections 12ª formed on the upper faces of the arms of the lever. The rods 28 are superposed upon the bars 29 and the said rods and the bars are made of metals having a different co-efficient of expansion from one another the material from which the bars 29 are formed being of metal having a higher co-efficient of expansion than the material from which the lever 12 is formed. For example, if the lever 12 is made of steel the bars 29 may be made conveniently of zinc. It should be emphasized that the rods 28 have no connection with the arms of the lever 12 and that the bars 29 are only secured to the said lever at one end, namely, the end adjacent the fulcrum of the lever.

The two shorter arms of the lever 12 are secured to the upper ends of a pair of vertically disposed rods 30 the lower ends whereof are pivotally connected to the outer ends of links 31 the inner ends of which are fulcrumed in brackets 32 secured to the base housing 9.

The shorter arm of the lever 12 is connected to the piston rod 33 of a dashpot the cylinder 34 whereof is supported from the base housing 9.

It will be appreciated that a cylinder scale constructed as hereinbefore described is simple in construction, efficient in operation and permits of a more compact arrangement of the scale than is possible with cylinder scales of the kind heretofore in use. Furthermore, the indicating mechanism is disposed below the scale pan and at an angle convenient for reading both by the customer and by the vendor. In addition, by reason of the location of the scale pan to one side and above the indicating mechanism no obscuration of the indicating mechanism obtains by reason of goods placed upon the scale pan. Moreover, it will be seen that a variation in temperature produces a greater difference in the effective length of the zinc bars 29 relatively to the scale lever 12 and hence by accurately calculating the length of the said bars, the expansion per unit degree rise or fall in temperature may be made to correspond to the loss or gain in the effective resistance value of the spring 22 for a like change of temperature, in other words, the moment of the spring 22 relatively to the fulcrum of the scale lever 12 varies according to the temperature the variation in the moment corresponding to the variation in the resistance value of the spring 22.

What I claim is:—

1. An automatic weighing apparatus comprising a weighbeam, a scale pan supported from said weighbeam, an automatic weighing resistant, a rotary weight indicator disposed below and at the side of the said scale pan, said indicator having its longitudinal axis disposed in the vertical plane containing the longitudinal axis of the weighbeam and means connected to the weighbeam and adapted to effect the rotation of the aforesaid indicator.

2. An automatic weighing apparatus comprising a base, a weighbeam supported from the said base, a scale pan mounted on the said weighbeam, a rotary weight indicator disposed below and at the side of the said scale pan, the longitudinal axis of the rotary indicator being disposed in the same vertical plane as the longitudinal axis of the weighbeam, a spring resistant anchored to the base and to the weighbeam and means connected to the weighbeam for effecting the rotation of the weight indicator.

3. An automatic weighing apparatus comprising a base, a weighbeam, a spring resistant connected to the base, means for adjusting the initial tension of the resistant, a thermostatic device connected at one end to the weighbeam and at its other end to the spring resistant said thermostatic device serving to vary the moment of the resistant about the fulcrum of the weighbeam to compensate automatically for errors of the resistant arising from changes in temperature, a rotary weight indicator, means connected to the weighbeam for effecting the rotation of said indicator, a scale pan support mounted on the weighbeam and disposed above and to one side of the indicator, means for preserving the vertical motion of the scale pan support and means for damping the movement of the weighbeam.

4. An automatic weighing apparatus comprising a base, a weighbeam supported from and fulcrumed on said base, a spring resistant connected to the base, means for adjusting the initial tension of the resistant, a thermostatic device connected at one end to the weighbeam and at its other end to the resistant said device serving to vary the moment of the spring about the fulcrum of the weighbeam in order to compensate automatically for errors of the resistant due to changes in temperature, a graduated rotary drum indicator, a fixed reading index adapted to co-operate with the drum indicator, means for magnifying the graduations on the said indicator, means for denoting the reading zone of said magnifying device, means connected to the weighbeam for effecting the rotation of the indicator, a scale pan support disposed above and to one side of the indicator, said support being mounted on the weighbeam, a linkage for preserving the true vertical motion of the scale pan support and means for damping the movement of the weighbeam.

5. An automatic weighing apparatus comprising a base, adjustable levelling means for said base, a support projecting upwardly from said base, a weighbeam fulcrumed on said support, a spring resistant, a member mounted on the base and connected to the lower end of the resistant, means for adjusting the said member for varying the initial degree of tension of said resistant, a thermostatic bar device anchored at one end to the weighbeam and at the other end to the upper end of the resistant said thermostatic bar device serving to vary the moment of the resistant about the fulcrum of the weighbeam in order to compensate automatically for errors of the resistant arising from changes of temperature, a graduated drum indicator rotatably mounted in said base and adapted to be located partially within the base, a cover adapted to fit on the base and to enclose the upper portion of the drum together with the weighbeam and thermostatic device, a fixed reading index carried by said cover, a magnifying device carried by the cover for magnifying the graduations on the drum, means embodied in the magnifying device for denoting the reading zone of the magnifying device, means connected to the weighbeam for effecting the rotation of the drum, a scale pan support mounted on the weighbeam and above and to one side of the drum, a linkage for preserving the true vertical motion of the scale pan support and a dashpot for damping the motion of the weighbeam.

In testimony whereof, I have signed my name to this specification.

WILLIAM TIMSON.